(12) United States Patent
Kouzu et al.

(10) Patent No.: US 11,942,270 B2
(45) Date of Patent: Mar. 26, 2024

(54) ELECTRICITY STORAGE DEVICE WITH SINTERED BODY

(71) Applicant: Murata Manufacturing Co., Ltd., Nagaokakyo (JP)

(72) Inventors: Masayuki Kouzu, Nagaokakyo (JP); Takeshi Sodeoka, Nagaokakyo (JP); Syouta Ikebe, Nagaokakyo (JP); Mami Aoki, Nagaokakyo (JP); Tomonori Ito, Nagaokakyo (JP); Tadahiro Minamikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 197 days.

(21) Appl. No.: 17/581,283

(22) Filed: Jan. 21, 2022

(65) Prior Publication Data

US 2022/0148821 A1 May 12, 2022

Related U.S. Application Data

(63) Continuation of application No. PCT/JP2020/016853, filed on Apr. 17, 2020.

(30) Foreign Application Priority Data

Aug. 6, 2019 (JP) ................................ 2019-144845

(51) Int. Cl.
*H01G 11/24* (2013.01)
*H01G 11/12* (2013.01)
(Continued)

(52) U.S. Cl.
CPC ............ *H01G 11/24* (2013.01); *H01G 11/12* (2013.01); *H01G 11/14* (2013.01); *H01G 11/52* (2013.01);
(Continued)

(58) Field of Classification Search
CPC ........ H01G 11/80; H01G 11/68; H01G 11/58; H01G 11/52; H01G 11/14; H01G 11/12; (Continued)

(56) References Cited

U.S. PATENT DOCUMENTS

| 6,445,566 B2 | 9/2002 | Watanabe et al. |
| 9,728,343 B2 | 8/2017 | Horikawa et al. |

(Continued)

FOREIGN PATENT DOCUMENTS

| JP | 09082572 A | * | 3/1997 |
| JP | 109237639 A | | 9/1997 |

(Continued)

OTHER PUBLICATIONS

International Search Report issued in PCT/JP2020/016853, dated Jul. 14, 2020.

(Continued)

*Primary Examiner* — David M Sinclair
(74) *Attorney, Agent, or Firm* — ArentFox Schiff LLP

(57) ABSTRACT

An electricity storage device includes an internal element that has a first main surface, a second main surface, a first side surface, a second side surface, a first end surface, and a second end surface, and that further includes a first internal electrode drawn out to the first end surface, a second internal electrode drawn out to the second end surface, a separator layer disposed between the first and second internal electrodes, and an electrolytic solution. Moreover, a first end surface electrode is disposed on the first end surface; and a second end surface electrode is disposed on the second end surface. The first internal electrode, the second internal electrode, the separator layer, the first end surface electrode, and the second end surface electrode are integrally sintered to form a sintered body.

20 Claims, 5 Drawing Sheets

(51) Int. Cl.
*H01G 11/14* (2013.01)
*H01G 11/52* (2013.01)
*H01G 11/58* (2013.01)
*H01G 11/68* (2013.01)
*H01G 11/80* (2013.01)
*H01M 4/66* (2006.01)
*H01M 10/0525* (2010.01)
*H01M 10/0585* (2010.01)
*H01M 50/117* (2021.01)
*H01M 50/124* (2021.01)
*H01M 50/434* (2021.01)
*H01M 50/636* (2021.01)

(52) U.S. Cl.
CPC ............ *H01G 11/58* (2013.01); *H01G 11/68* (2013.01); *H01G 11/80* (2013.01); *H01M 4/661* (2013.01); *H01M 10/0525* (2013.01); *H01M 10/0585* (2013.01); *H01M 50/117* (2021.01); *H01M 50/124* (2021.01); *H01M 50/434* (2021.01); *H01M 50/636* (2021.01)

(58) Field of Classification Search
CPC .............. H01G 11/24; H01M 10/0585; H01M 10/0525; H01M 4/661; H01M 50/117; H01M 50/636; H01M 50/434; H01M 50/124
See application file for complete search history.

(56) References Cited

U.S. PATENT DOCUMENTS

| | | |
|---|---|---|
| 10,163,581 B2 | 12/2018 | Aoki et al. |
| 2001/0012193 A1 | 8/2001 | Watanabe et al. |
| 2007/0014076 A1* | 1/2007 | Omura ................ H01M 50/193 |
| | | 361/502 |
| 2014/0106213 A1 | 4/2014 | Horikawa et al. |
| 2015/0221448 A1* | 8/2015 | Horikawa ............. H01G 11/72 |
| | | 361/502 |
| 2018/0012708 A1 | 1/2018 | Aoki et al. |

FOREIGN PATENT DOCUMENTS

| | | | |
|---|---|---|---|
| JP | 2005019311 A | | 1/2005 |
| JP | 3959220 B2 | | 8/2007 |
| JP | 2014116156 A | * | 6/2014 |
| JP | 2015065022 A | * | 4/2015 |
| JP | 2017147398 A | | 8/2017 |
| WO | 2013001908 A1 | | 1/2013 |
| WO | 2013002119 A1 | | 1/2013 |
| WO | 2016167156 A1 | | 10/2016 |

OTHER PUBLICATIONS

Written Opinion of the International Searching Authority issued for PCT/JP2020/016853, dated Jul. 14, 2020.

* cited by examiner

ELECTRICITY STORAGE DEVICE WITH SINTERED BODY

CROSS REFERENCE TO RELATED APPLICATIONS

The present application is a continuation of PCT/JP2020/016853 filed Apr. 17, 2020, which claims priority to Japanese Patent Application No. 2019-144845, filed Aug. 6, 2019, the entire contents of each of which are incorporated herein by reference.

TECHNICAL FIELD

The present invention relates to an electricity storage device.

BACKGROUND

Electricity storage devices, such as capacitors and secondary batteries, used in small electronic devices are chip type devices which can be reflow-mounted on a substrate, and are desired to have high capacity and high output.

Various electricity storage devices, such as capacitors and secondary batteries, have been known. As one of the electricity storage devices, Japanese Patent No. 3959220 (hereinafter "Patent Document 1") describes an electric double layer capacitor having a structure in which a separator is provided between a positive electrode active material and a negative electrode active material. Patent Document 1 also describes that a resin, such as polyphenylene sulfide, polyethylene terephthalate, polyamide, or polyimide, is used as a separator, and that polyethylene oxide is contained as an active material.

Further, Japanese Patent Application Laid-Open No. 2017-147398 (hereinafter "Patent Document 2" describes a capacitor having a structure in which a plurality of internal electrodes and a plurality of solid electrolyte layers are alternately laminated. Patent Document 2 describes that nickel is used as an internal electrode and a metal oxide $Li_7La_3Zr_2O_{12}$ is used as a solid electrolyte.

However, in the electric double layer capacitor described in Patent Document 1, since an organic substance is contained in the separator or the active material, the organic substance may be thermally decomposed or structurally changed at the time of reflow mounting, and desired characteristics may not be obtained.

On the other hand, the capacitor described in Patent Document 2 is provided with a solid electrolyte having lithium ion conductivity instead of a separator impregnated with an electrolytic solution, and is configured to contain no organic substance.

However, an electricity storage device provided with a solid electrolyte has low ionic conductivity and high interfacial resistance between an electrode and an electrolyte, compared with an electricity storage device having an electrolytic solution. Consequently, the output of the electricity storage device provided with a solid electrolyte is higher than that of the electricity storage device having an electrolytic solution.

SUMMARY OF THE INVENTION

Accordingly, it is an object of the present invention to provide an electricity storage device in which a decrease in output can be suppressed by reducing the thermal decomposition and structural change of the organic substance at the time of reflow mounting and by forming a structure containing an electrolytic solution without using a solid electrolyte.

In an exemplary embodiment, an electricity storage device includes an internal element that has a first main surface and a second main surface, the first main surface and the second main surface extending along a length direction and a width direction and facing in a thickness direction; a first side surface and a second side surface, the first side surface and the second side surface extending along the length direction and the thickness direction and facing in the width direction; and a first end surface and a second end surface, the first end surface and the second end surface extending along the width direction and the thickness direction and facing in the length direction. Moreover, the electricity storage device includes a first internal electrode drawn out to the first end surface; a second internal electrode drawn out to the second end surface; a separator layer located between the first internal electrode and the second internal electrode; and an electrolytic solution. A first end surface electrode is provided on the first end surface and connected to the first internal electrode drawn out to the first end surface; and a second end surface electrode is provided on the second end surface and connected to the second internal electrode drawn out to the second end surface. In addition, the first internal electrode, the second internal electrode, the separator layer, the first end surface electrode, and the second end surface electrode are integrally sintered to form a sintered body.

Moreover, in an exemplary aspect, the electricity storage device includes the internal element, the first end surface electrode, and the second end surface electrode, and a sintered body formed by integrally sintering the first internal electrode, the second internal electrode, the separator layer, the first end surface electrode, and the second end surface electrode contains no organic substance. Therefore, the thermal decomposition and structural change of the organic substance can be reduced during reflow mounting, and desired characteristics can be obtained after reflow mounting. Further, since the electricity storage device includes an electrolytic solution inside, the ion conductivity is high and the interfacial resistance of the electrode is low as compared with an electricity storage device having a solid electrolyte, so that a higher output can be obtained.

DETAILED DESCRIPTION

Hereinafter, the features of the present invention will be specifically described with reference to exemplary embodiments.

FIRST EXEMPLARY EMBODIMENT

Figure 1:
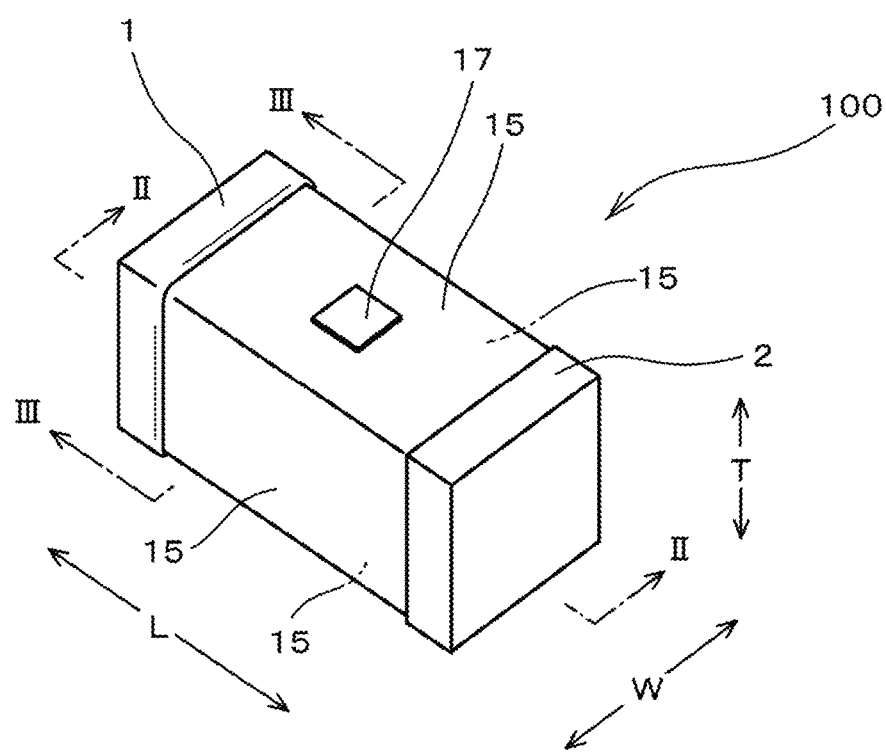
FIG. 1 is a perspective view schematically illustrating a configuration of an electricity storage device according to a first exemplary embodiment.
Figure 2:
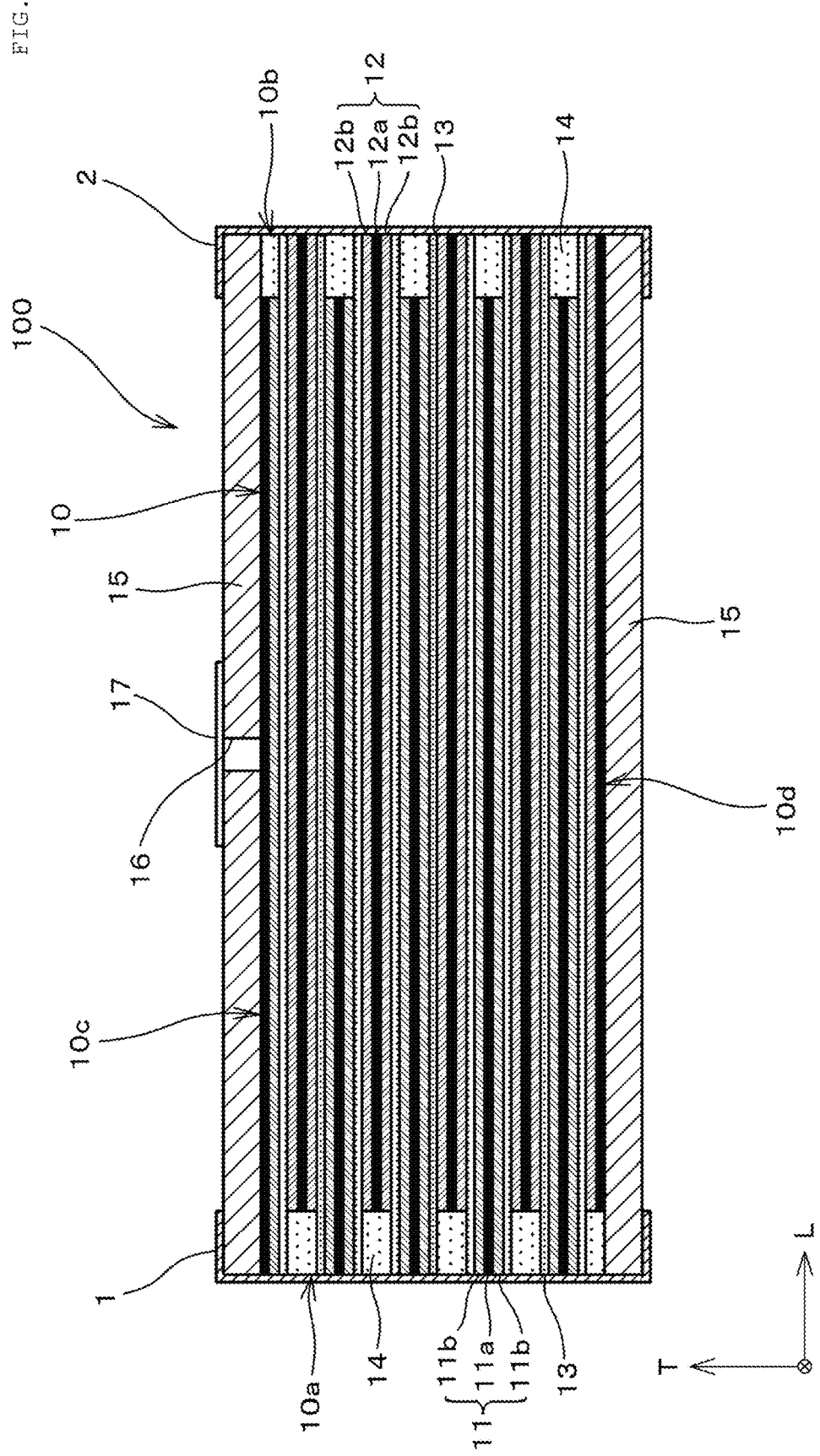
FIG. 2 is a schematic sectional view taken along a line II-II of the electricity storage device illustrated in FIG. 1.
Figure 3:
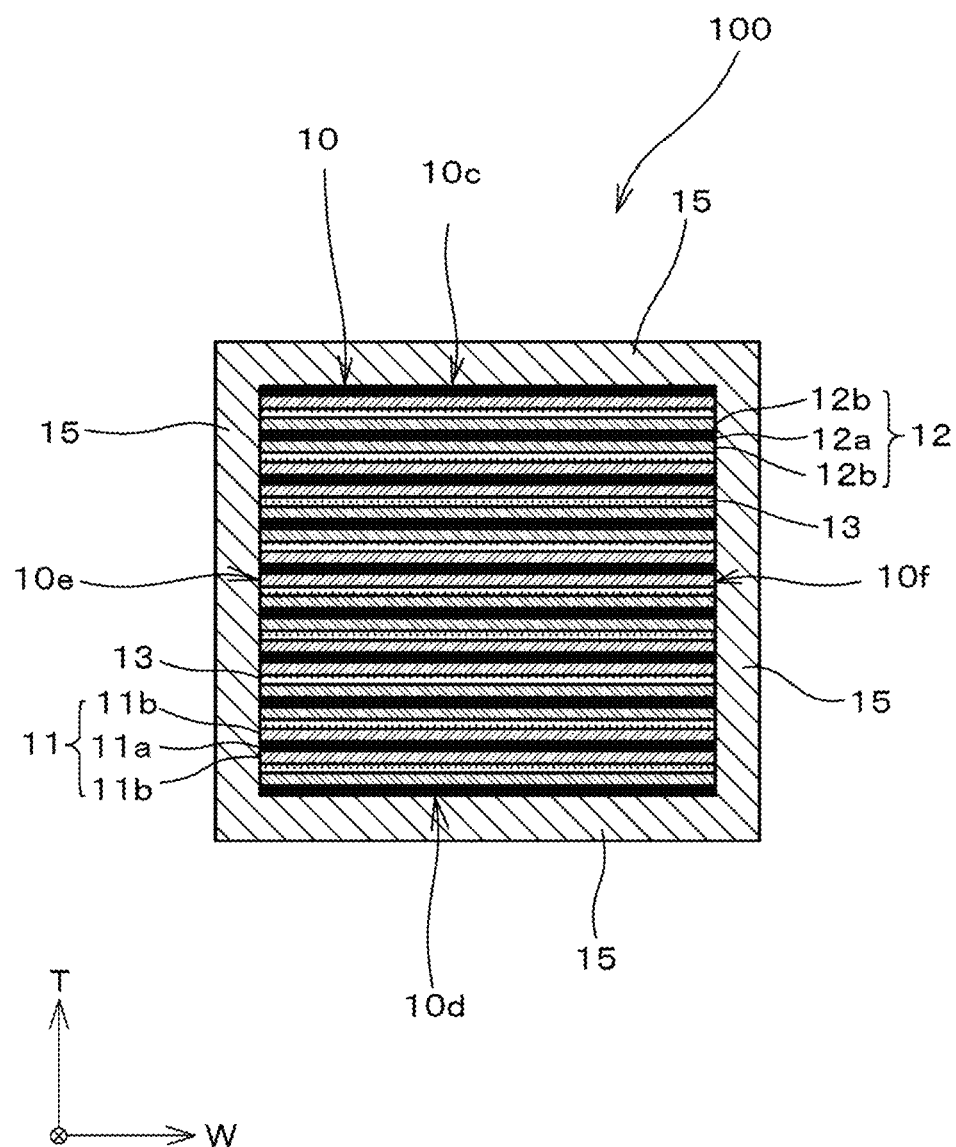
FIG. 3 is a schematic sectional view taken along a line III-III of the electricity storage device illustrated in FIG. 1.

FIG. 1 is a perspective view schematically illustrating a configuration of an electricity storage device 100 according to a first exemplary embodiment. FIG. 2 is a schematic sectional view taken along a line II-II of the electricity storage device 100 illustrated in FIG. 1. FIG. 3 is a schematic sectional view taken along a line III-III of the electricity storage device 100 illustrated in FIG. 1. In FIGS. 1 to 3, a symbol L indicates a length direction, a symbol W indicates a width direction, and a symbol T indicates a thickness direction (e.g., a laminating direction of internal electrodes).

In this disclosure, it is assumed that the electricity storage device 100 is an electric double layer capacitor. However, it is noted that the electricity storage device 100 is not limited to the electric double layer capacitor, and can be various electricity storage devices, such as a lithium ion capacitor, a redox capacitor, an aluminum electrolytic capacitor, and a lithium ion secondary battery. The electricity storage device 100 can be used for various purposes such as communication devices.

As shown, the electricity storage device 100 includes an internal element 10, a first end surface electrode 1, and a second end surface electrode 2. The electricity storage device 100 in the present embodiment further includes an outer layer 15. In the exemplary aspect, the internal element 10 can be an electric double layer capacitor element.

The internal element 10 has a substantially rectangular parallelepiped shape. Specifically, the internal element 10 has a first end surface 10a and a second end surface 10b facing in the length direction L, a first main surface 10c and a second main surface 10d facing in the thickness direction T, and a first side surface 10e and a second side surface 10f facing in the width direction W. The first end surface 10a and the second end surface 10b extend along the width direction W and the thickness direction T. The first main surface 10c and the second main surface 10d extend along the length direction L and the width direction W. The first side surface 10e and the second side surface 10f extend along the length direction L and the thickness direction T.

In general, the "rectangular parallelepiped" according to an exemplary aspect includes a rectangular parallelepiped having chamfered or rounded corners and ridges. Each of the corners is a portion where three surfaces of the internal element 10 intersect with one another, and each of the ridges is a portion where two surfaces of the internal element 10 intersect with each other.

The internal element 10 includes a first internal electrode 11, a second internal electrode 12, a separator layer 13, and an electrolytic solution. Further, the internal element 10 in the present embodiment further includes an insulating layer 14.

The first internal electrodes 11 and the second internal electrodes 12 are alternately laminated in a plurality of layers with the separator layer 13 interposed therebetween. In other words, the plurality of the first internal electrodes 11 and the plurality of the second internal electrodes 12 are alternately laminated with the separator layer 13 interposed therebetween.

As further shown, the first internal electrode 11 has a first current collector 11a and a first active material layer 11b provided on both sides of the first current collector 11a. However, when the first internal electrode 11 is located on the outermost side in the thickness direction T, the first active material layer 11b may be provided only on at least an inner side surface in the thickness direction T, of the first current collector 11a of the first internal electrode 11 located on the outermost side. Moreover, the first current collector 11a and the first active material layer 11b are joined to each other.

While the first internal electrode 11 is drawn out to the first end surface 10a of the internal element 10, the first internal electrode 11 is not drawn out to the second end surface 10b, the first side surface 10e, and the second side surface 10f. Further, on the side of the first end surface 10a, the first active material layer 11b faces the insulating layer 14 with the separator layer 13 interposed therebetween. However, when the first internal electrode 11 is located on the outermost side in the thickness direction T, a portion where the first active material layer 11b faces the insulating layer 14 may be removed.

The second internal electrode 12 has a second current collector 12a and a second active material layer 12b provided on both sides of the second current collector 12a. However, when the second internal electrode 12 is located on the outermost side in the thickness direction T, the second active material layer 12b may be provided only on at least an inner side surface in the thickness direction T, of the second current collector 12a of the second internal electrode 12 located on the outermost side. Moreover, the second current collector 12a and the second active material layer 12b are joined to each other.

While the second internal electrode 12 is drawn out to the second end surface 10b of the internal element 10, the second internal electrode 12 is not drawn out to the first end surface 10a, the first side surface 10e, and the second side surface 10f. Further, on the side of the second end surface 10b, the second active material layer 12b faces the insulating layer 14 with the separator layer 13 interposed therebetween. However, when the second internal electrode 12 is located on the outermost side in the thickness direction T, a portion where the second active material layer 12b faces the insulating layer 14 may be removed.

According to an exemplary aspect, the first current collector 11a and the second current collector 12a are sintered bodies of metal particles such as Al particles, Cu particles, and Ni particles. More specifically, the first current collector 11a and the second current collector 12a are sintered or necked structures after the process of sintering metal particles such as Al particles, Cu particles, and Ni particles, and have conductivity as a whole.

In the exemplary aspect, the first active material layer 11b and the second active material layer 12b contain active material particles and an inorganic filler composed of an inorganic substance. For example, a carbon material such as activated carbon may be used as the active material. The inorganic filler is added to maintain the structure, and for example, carbon nanotubes and carbon nanofibers may be used.

When the electricity storage device 100 is a lithium ion secondary battery, a substance configured for storing and releasing lithium ions is used as the active material contained in the first active material layer 11b and the second active material layer 12b. For example, as the positive electrode active material, lithium oxides such as lithium cobaltite, lithium nickelate, lithium manganate, and lithium iron phosphate may be used. Further, as the negative electrode active material, carbon such as graphite, lithium titanate, and silicon oxide may be used. In each of the first current collector 11a and the second current collector 12a, metal particles made of Al may be used as the positive electrode current collector, and metal particles made of Cu may be used as the negative electrode current collector.

In addition, when the electricity storage device 100 is a lithium ion secondary battery, it is preferable that the outer edge of the positive electrode active material is arranged inside the outer edge of the negative electrode active material in plane directions defined by the length direction L and the width direction W. Such configuration prevents precipitation of Li ions and short-circuiting at the outer edge of the negative electrode active material.

When the electricity storage device 100 is an aluminum electrolytic capacitor, at least one of the first current collector 11a and the second current collector 12a is a sintered body of Al particles. A chemical conversion treatment is performed on the surface of the sintered body to form an oxide film, so that it is possible to allow the oxide film to function as a dielectric layer. A general-purpose method may be used for the chemical conversion treatment, and an oxide film to be a dielectric layer can be formed by applying a DC voltage in a water bath of ammonium phosphate, ammonium adipate or the like. It is preferable that the oxide film is washed with pure water or the like after chemical conversion.

As further shown, the separator layer 13 is provided between the first active material layer 11b of the first internal electrode 11 and the second active material layer 12b of the second internal electrode 12. The separator layer 13 is a porous body provided with a plurality of pores in which ions contained in the electrolytic solution can move between the first active material layer 11b and the second active material layer 12b.

In general, it is noted that the type of electrolytic solution is not particularly limited, and examples thereof include an ionic liquid such as EMITFSI (1-ethyl-3-methylimidazolium bis (trifluoromethanesulfonyl) imide) or EMIBF4 (1-ethyl-3-methylimidazolium tetrafluoroborate), or a solution obtained by dissolving the ionic liquid in an organic solvent such as propylene carbonate or acetonitrile.

Moreover, the electricity storage device 100 can be a lithium ion secondary battery and a known electrolytic solution may be used. For example, a solution obtained by dissolving a Li salt such as $LiPF_6$ or $LiBF_4$ in a solvent, such as propylene carbonate or ethylene carbonate, can be used as the electrolytic solution.

In addition, there are no particular restrictions when the electricity storage device 100 is an aluminum electrolytic capacitor, and a known electrolytic solution may be used. For example, a solvent obtained by dissolving an ammonium salt of an organic acid such as phthalic acid or adipic acid or an inorganic acid such as boric acid or phosphoric acid in a solvent such as ethylene glycol or γ-butyl lactone may be used as the electrolytic solution.

Moreover, in an exemplary aspect, the separator layer 13 is a sintered body formed from a material containing at least one of a ceramic material containing at least one selected from the group consisting of oxides, nitrides, and carbides, and a glass material as an amorphous solid. The separator layer 13 may further contain an inorganic filler or the like.

The number of layers when the structure in which the separator layer 13 is sandwiched between the first internal electrode 11 and the second internal electrode 12 is defined as one layer can be any number. In other words, one layer may be formed or a plurality of layers of two or more layers may be formed.

As further shown, the insulating layer 14 is provided in a region that is not in contact with the first internal electrode 11 and the second internal electrode 12, on each side of the separator layer 13, in order to eliminate bumps. Specifically, the insulating layer 14 with the same thickness as that of the first internal electrode 11 is provided in a region not in contact with the first internal electrode 11, on the surface that is in contact with the first internal electrode 11, on each side of the separator layer 13. Further, the insulating layer 14 with the same thickness as that of the second internal electrode 12 is provided in a region not in contact with the second internal electrode 12, on the surface that is in contact with the second internal electrode 12, on each side of the separator layer 13. The insulating layer 14 is provided to suppress the occurrence of the above-mentioned bumps, and for example, suppress curving of the ends of the first internal electrode 11 and the ends of the second internal electrode 12 during pressing in the manufacturing process.

It is also noted that the insulating layer 14 is not particularly limited as long as it is formed of an insulating material, and is, for example, a sintered body formed from a material containing at least one of a ceramic material containing at least one selected from the group consisting of oxides, nitrides, and carbides, and a glass material as an amorphous solid. The insulating layer 14 may further contain an inorganic filler or the like.

The first internal electrode 11, the second internal electrode 12, the separator layer 13, and the insulating layer 14 mentioned above have a structure through which the electrolytic solution permeates.

Further, in the present embodiment, an outer layer 15 is provided to protect both outsides of the internal element 10 in the thickness direction T and both outsides of the internal element 10 in the width direction W, i.e., the first main surface 10c, the second main surface 10d, the first side surface 10e, and the second side surface 10f of the internal element 10. The outer layer 15 is a sintered body formed from a material containing at least one of a ceramic material containing at least one selected from the group consisting of oxides, nitrides, and carbides, and a glass material as an amorphous solid. For example, $Al_2O_3$ may be used as the ceramic material. The outer layer 15 has a structure having high airtightness, and is configured so that moisture does not enter from the outside and the electrolytic solution does not leak to the outside of the internal element 10.

The separator layer 13, the insulating layer 14, and the outer layer 15 are sintered bodies formed from a material containing at least one of a ceramic material containing at least one selected from the group consisting of oxides, nitrides, and carbides, and a glass material as an amorphous solid. For example, the content of the glass material is adjusted, so that the separator layer 13 has a structure that allows the electrolytic solution to permeate, and the outer layer 15 has a structure that does not allow the electrolytic solution to permeate.

As illustrated in FIG. 2, the outer layer 15 is provided with an injection port 16 for injecting an electrolytic solution. In the present embodiment, one injection port 16 is provided at the center of the outer layer 15 located on one of the outsides in the thickness direction T. However, the position where the injection port 16 is provided is not limited to the above-mentioned position, and the injection port 16 may be provided on the outer layer 15 located outside in the width direction W, for example. Further, the configuration may be such that two or more injection ports 16 are provided.

Moreover, the injection port 16 is sealed by a sealing member 17. The constituent material of the sealing member 17 is not particularly limited as long as the intrusion of moisture from the outside and the permeation of the electrolytic solution from the inside are suppressed. Since it is desirable to have high airtightness and high liquid tightness, it is preferable to use a metal or glass material as the sealing member 17. For example, the injection port 16 can be sealed by metallizing the periphery of the injection port of the outer layer 15 and joining a metal plate with a brazing material, such as silver or tin, by heating or welding. However, it is noted that the sealing member 17 is not limited to a metal plate, and can be a plate-like material made of a material other than metal, such as a glass plate, or may be a member such as a resin provided so as to close the injection port 16. When a resin is used, for example, an epoxy resin may be used.

Moreover, the first end surface electrode 1 is provided on the first end surface 10a of the internal element 10, and is electrically connected to a plurality of first internal electrodes 11 drawn out to the first end surface 10a. In the present embodiment, the first end surface electrode 1 is provided on the entire first end surface 10a of the internal element 10 and is provided so as to wrap around sides of the first main surface 10c, the second main surface 10d, the first side surface 10e, and the second side surface 10f of the internal element 10, in a manner of covering a part of the outer layer 15.

Similarly, the second end surface electrode 2 is provided on the second end surface 10b of the internal element 10, and is electrically connected to a plurality of second internal electrodes 12 drawn out to the second end surface 10b. In the present embodiment, the second end surface electrode 2 is provided on the entire second end surface 10b of the internal element 10, and is provided so as to wrap around sides of the first main surface 10c, the second main surface 10d, the first side surface 10e, and the second side surface 10f of the internal element 10, in a manner of covering a part of the outer layer 15.

The first end surface electrode 1 and the second end surface electrode 2 are a composite of metal particles and glass as an amorphous solid. The metal particles are, for example, Al particles, Cu particles, or Ni particles. Moreover, the metal particles contained in the first end surface electrode 1 and the second end surface electrode 2 are sintered or necked after the sintering process, and have conductivity as a whole. Further, the first end surface electrode 1 and the second end surface electrode 2 have a structure having high airtightness, and can be configured, for example, by adjusting the content of the glass material.

Moreover, in an exemplary aspect, the surfaces of the first end surface electrode 1 and the second end surface electrode 2 may be plated, if necessary. For example, Ni plating may be applied, and then Zn plating may be applied on the Ni plating.

As an example of the size, the dimensions of the electricity storage device 100 in the length direction L, in the width direction W, and in the thickness direction T are 7.3 mm, 4.3 mm, and 2.0 mm, respectively. In that case, the thickness of the outer layer 15 is 0.5 mm, the thicknesses of the first end surface electrode 1 and the second end surface electrode 2 are 0.1 mm, the thicknesses of the first current collector 11a and the second current collector 12a are 5 μm, the thicknesses of the first active material layer 11b and the second active material layer 12b are 30 μm, and the thickness of the separator layer 13 is 15 μm; and the number of layers when the structure in which the separator layer 13 is sandwiched between the first internal electrode 11 and the second internal electrode 12 is defined as one layer can be ten. The capacity of the electricity storage device 100 is, for example, 90 mF.

In the electricity storage device 100 according to the present embodiment, a sintered body is formed by integrally sintering the first internal electrode 11, the second internal electrode 12, the separator layer 13, the insulating layer 14, the outer layer 15, the first end surface electrode 1, and the second end surface electrode 2. The integrally sintered body is a structure formed by pressure-molding particles of materials for the first internal electrode 11, the second internal electrode 12, the separator layer 13, the insulating layer 14, the outer layer 15, the first end surface electrode 1, and the second end surface electrode 2 so as to be a desired structure, and heat-treating the resultant product so that at least some of these particles are bonded to each other and integrated.

According to this configuration, no organic substance is contained in the first internal electrode 11, the second internal electrode 12, the separator layer 13, the insulating layer 14, the outer layer 15, the first end surface electrode 1, and the second end surface electrode 2. Therefore, the thermal decomposition and structural change of the organic substance can be reduced during reflow mounting, and desired characteristics can be obtained after reflow mounting.

In order to reduce the thermal decomposition and structural change of the organic substance during reflow mounting, it is preferable that no organic substance is contained in the first internal electrode 11, the second internal electrode 12, the separator layer 13, the insulating layer 14, the outer layer 15, the first end surface electrode 1, and the second end surface electrode 2, but it should be appreciated that this does not preclude a configuration in which an organic substance is contained to the extent that the characteristics of the electricity storage device 100 are not affected.

Further, since the electricity storage device 100 in the present embodiment includes an electrolytic solution inside, the ion conductivity is high and the interfacial resistance of the electrode is low as compared with an electricity storage device having a solid electrolyte, so that a higher output can be obtained.

Further, the electricity storage device 100 in the present embodiment has a structure in which there is no void among the outer layer 15, the first internal electrode 11, the second internal electrode 12, the separator layer 13, and the insulating layer 14. Therefore, the size of the internal element 10 with respect to the total size can be increased to increase the capacity and output per volume.

(Method of Producing Electricity Storage Device)

An example of a method of producing the electricity storage device 100 having the above-mentioned configuration will be described.

A paste containing a material for forming the separator layer 13, a paste containing a material for forming the first active material layer 11b (and the second active material layer 12b), a paste containing a material for forming first current collector 11a (and the second current collector 12a), a paste containing a material for forming the first active material layer 11b (and the second active material layer 12b) are sequentially applied onto a carrier film. In addition, a paste containing a material for forming the insulating layer 14 is applied to an area where the paste containing a material for forming the first active material layer 11b (and the second active material layer 12b) is not applied.

As the pastes mentioned above, known pastes used in forming a green sheet for producing a multilayer ceramic capacitor may be used, and the pastes can be obtained by mixing each of the constituent materials with a dispersed material, a plasticizer, a binder, and an organic solvent.

In order to obtain a desired structure, coating is preferably performed using a metal mask with an appropriate pattern for each configuration, or the like.

Subsequently, a plurality of the above-mentioned structures from which the carrier film has been removed is laminated. At this time, the first internal electrode 11 and the second internal electrode 12 obtained after firing are laminated while being slightly shifted so as to be drawn out alternately. After lamination, a sheet obtained by applying a material for forming the outer layer 15 to a carrier film is laminated on both outsides in the laminating direction, and this is once pressed to obtain an unfired mother laminate.

Subsequently, the mother laminate is cut into a predetermined size for individualization. Then, a sheet obtained by applying a material for forming the outer layer 15 to a carrier film is attached to the exposed side surface portion, and the sheet is further pressed and bonded. Although a hole serving as the injection port 16 is formed on the surface, the hole may be formed on the sheet before lamination or after lamination. A jig, a cutting device, a laser, or the like may be used for the drilling process for forming the injection port. As a result, an unfired multi-layer chip is obtained.

Subsequently, a paste containing materials for forming the first end surface electrode 1 and the second end surface electrode 2 is applied to the end surface portion of the multi-layer chip, and then the whole is fired. The firing temperature is determined by the melting point of the materials used. For example, when Al is used for the current collector, the firing temperature is preferably 700° C. or more and 800° C. or less. Further, the first end surface electrode 1 and the second end surface electrode 2 are plated, if necessary.

Subsequently, an electrolytic solution is injected from the injection port 16. As mentioned above, since the first internal electrode 11, the second internal electrode 12, the separator layer 13, and the insulating layer 14 have a structure through which the electrolytic solution permeates, the electrolytic solution permeates the entire inside of the internal element 10. The permeation of the electrolytic solution is preferably carried out in vacuum. After injecting the electrolytic solution, the injection port 16 is sealed by the sealing member 17.

Thus, in an exemplary aspect, the electricity storage device 100 can be produced by the above-mentioned steps.

SECOND EXEMPLARY EMBODIMENT

Figure 4:
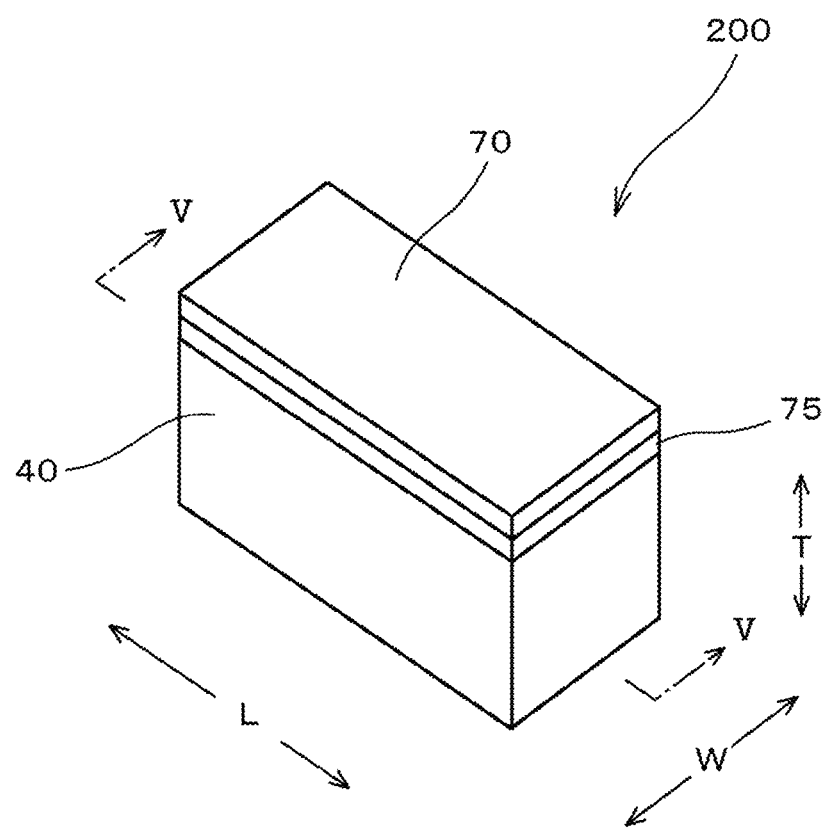
FIG. 4 is a perspective view schematically illustrating a configuration of an electricity storage device according to a second exemplary embodiment.
Figure 5:
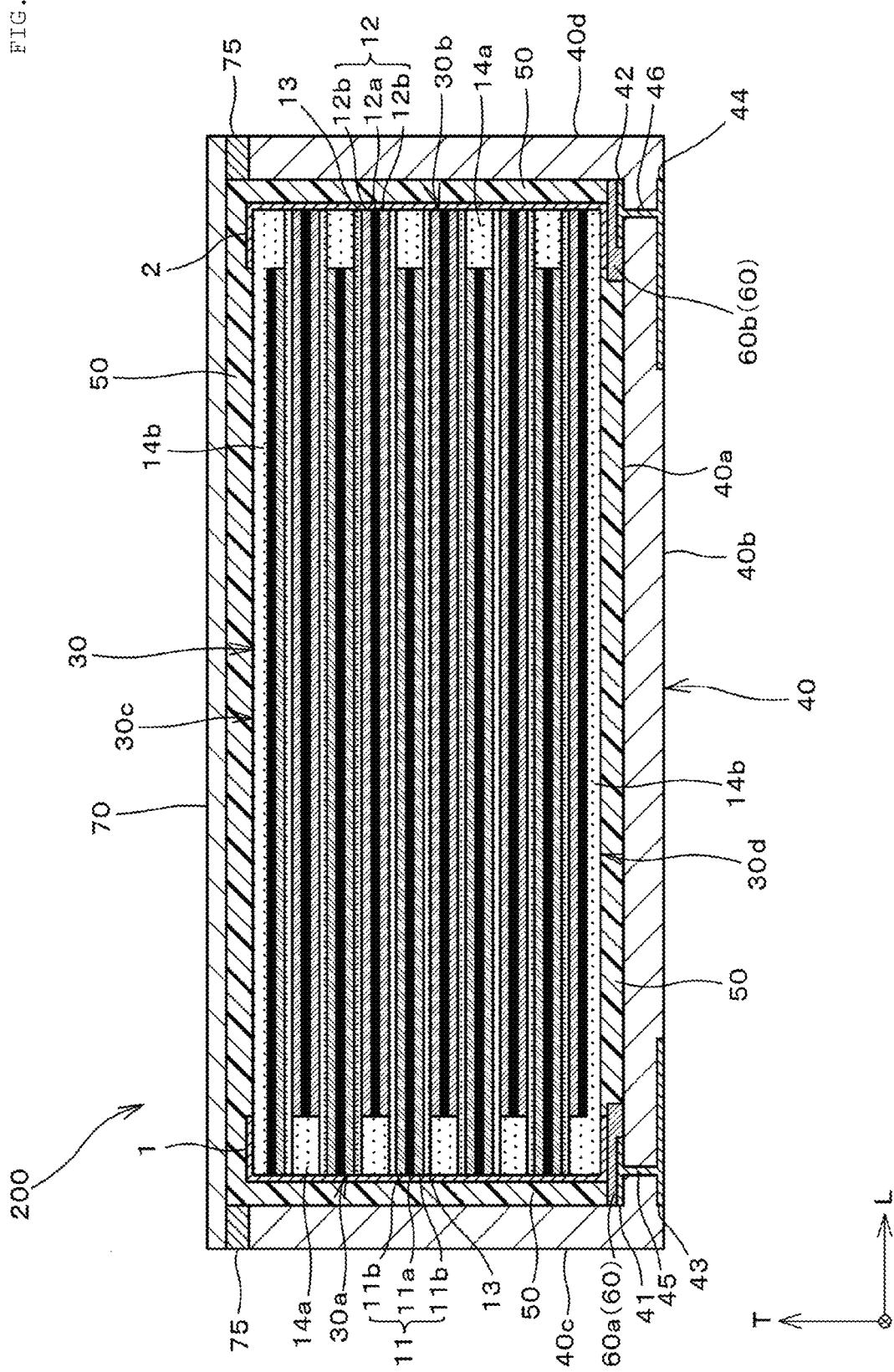
FIG. 5 is a schematic sectional view taken along a line V-V of the electricity storage device illustrated in FIG. 4.

FIG. 4 is a perspective view schematically illustrating a configuration of an electricity storage device 200 according to a second exemplary embodiment. FIG. 5 is a schematic sectional view taken along a line V-V of the electricity storage device 200 illustrated in FIG. 4.

In this embodiment, the electricity storage device 200 can be an electric double layer capacitor. However, the electricity storage device 200 is not limited to the electric double layer capacitor, and can be various electricity storage devices, such as a lithium ion capacitor, a redox capacitor, an aluminum electrolytic capacitor, and a lithium ion secondary battery.

As shown, the electricity storage device 200 in the second embodiment includes an internal element 30, a storage container 40, and a conductive part 60. Similarly to the electricity storage device 100 in the first embodiment, the internal element 30 contains an electrolytic solution, but in the electricity storage device 200 in the present embodiment, an electrolytic solution 50 is also present between the storage container 40 and the internal element 30.

Similarly to the internal element 10 of the electricity storage device 100 in the first embodiment, the internal element 30 includes the first internal electrode 11, the second internal electrode 12, the separator layer 13, the insulating layer 14, and an electrolytic solution. Moreover, the first internal electrode 11, the second internal electrode 12, and the separator layer 13 forming the internal element 30 are the same as the first internal electrode 11, the second internal electrode 12, and the separator layer 13 of the electricity storage device 100 according to the first embodiment.

In the exemplary aspect, the insulating layer 14 includes a first insulating layer 14a and a second insulating layer 14b. The first insulating layer 14a is the same as the insulating layer 14 of the electricity storage device 100 in the first embodiment, and the first insulating layer 14a is provided in a region not in contact with the first internal electrode 11 and the second internal electrode 12, on each side of the separator layer 13, in order to eliminate bumps. The second insulating layer 14b is provided on both outsides of the internal element 30 in the thickness direction T, and has a structure through which the electrolytic solution 50 permeates. Moreover, the first insulating layer 14a and the second insulating layer 14b are made of the same material. However, the materials for forming the first insulating layer 14a and the second insulating layer 14b may be different materials in an alternative aspect.

The electricity storage device 100 according to the first embodiment is provided with the outer layer 15 that protects the first main surface 10c, the second main surface 10d, the first side surface 10e, and the second side surface 10f of the internal element 10. However, no outer layer is provided in the electricity storage device 200 in the present embodiment. In order to maintain the structural strength of the internal element 30, the outer layer may be provided in the present embodiment as well, but in that case, the outer layer has a structure through which the electrolytic solution 50 permeates. For example, the content of the glass material is adjusted, so that the outer layer can have a structure through which the electrolytic solution permeates.

The first end surface electrode 1 provided on the first end surface 30a of the internal element 30 and the second end surface electrode 2 provided on the second end surface 30b are the same as the first end surface electrode 1 and the second end surface electrode 2 of the electricity storage device 100 according to the first embodiment.

The storage container 40 has a recess for accommodating the internal element 30. Specifically, the storage container 40 is a bottomed tubular housing having a cavity at one end, a bottom surface facing the cavity, and side walls substantially perpendicular to the bottom surface. The storage container 40 is a sintered body formed from a material containing at least one of a ceramic material containing at least one selected from the group consisting of oxides, nitrides, and carbides, and a glass material as an amorphous solid. A known ceramic package may be used as the storage container 40.

The storage container 40 includes four side walls: a first side wall 40c; a second side wall 40d; a third side wall; and a fourth side wall. The height of the side wall, i.e., the dimension of the side wall in the thickness direction T is larger than the dimension of the internal element 30 in the thickness direction T.

A first terminal 41 and a second terminal 42 are provided on an inner bottom surface 40a, which is a bottom surface of the storage container 40 and is a surface on the side of the cavity. The inner bottom surface 40a is a surface facing the second main surface 30d of the internal element 30. In the present embodiment, one end of the first terminal 41 is in contact with the first side wall 40c of the storage container 40, and one end of the second terminal 42 is in contact with the second side wall 40d of the storage container 40.

Among the four side walls of the storage container 40, the first side wall 40c is a side wall facing the first end surface electrode 1, and the second side wall 40d is a side wall facing the second end surface electrode 2. Further, the third side wall is a side wall facing the first side surface of the internal element 30, and the fourth side wall is a side wall facing the second side surface of the internal element 30.

As further shown, a first external electrode 43 and a second external electrode 44 are disposed on an outer bottom surface 40b, which is a bottom surface of the storage container 40 and is a surface opposite to the inner bottom surface 40a. The first external electrode 43 is electrically connected to the first terminal 41 with a first via conductor 45 interposed therebetween. Further, the second external electrode 44 is electrically connected to the second terminal 42 with a second via conductor 46 interposed therebetween.

The electrolytic solution 50 is stored in the storage container 40. In the present embodiment, the electrolytic solution 50 is stored in the storage container 40 up to the upper surface of the internal element 30, i.e., a position higher than the first main surface 30c of the internal element 30. The electrolytic solution 50 is present not only between the storage container 40 and the internal element 30, but also in the internal element 30.

The conductive part 60 electrically connects the internal element 30 to the external electrodes 43 and 44 provided in the storage container 40. More specifically, the conductive part 60 includes a first conductive part 60a that electrically connects between the first end surface electrode 1 and the first terminal 41, and a second conductive part 60b that electrically connects between the second end surface electrode 2 and the second terminal 42.

The first conductive part 60a is provided so as to cover the surface of the first terminal 41. Further, the second conductive part 60b is provided so as to cover the surface of the second terminal 42. With such a configuration, the first terminal 41 and the second terminal 42 can be prevented from coming into contact with the electrolytic solution 50, and the first terminal 41 and the second terminal 42 can be prevented from corroding due to the contact with the electrolytic solution 50.

With the above-mentioned configuration, the plurality of first internal electrodes 11 of the internal element 30 is electrically connected to the first external electrode 43 with the first end surface electrode 1, the first conductive part 60a, the first terminal 41, and the first via conductor 45 interposed therebetween. Further, the plurality of second internal electrodes 12 of the internal element 30 is electrically connected to the second external electrode 44 with the second end surface electrode 2, the second conductive part 60b, the second terminal 42, and the second via conductor 46 interposed therebetween.

Moreover, the conductive part 60 includes a composite of metal particles and glass as an amorphous solid and has conductivity as a whole. The metal particles, for example, Al particles, are sintered or necked after the sintering process. Further, the glass is contained in the conductive part in an amount of 10% by volume or more and 50% by volume or less.

In this exemplary embodiment, the first internal electrode 11, the second internal electrode 12, the separator layer 13, the insulating layer 14, the first end surface electrode 1, the second end surface electrode 2, the storage container 40, and the conductive part 60 are integrally sintered to form a sintered body, and the sintered body contain no organic substance. Therefore, in the electricity storage device 200 in the second embodiment, similarly to the electricity storage device 100 in the first embodiment, the thermal decomposition and structural change of the organic substance can be reduced during reflow mounting, and desired characteristics can be obtained after reflow mounting.

In order to reduce the thermal decomposition and structural change of the organic substance during reflow mounting, it is preferable that no organic substance is contained in the first internal electrode 11, the second internal electrode 12, the separator layer 13, the insulating layer 14, the first end surface electrode 1, the second end surface electrode 2, and the conductive part 60. However, it is noted that this exemplary aspect does not preclude a configuration in which an organic substance is contained to the extent that the characteristics of the electricity storage device 200 are not affected.

Further, since the electricity storage device 200 in the present embodiment includes an electrolytic solution inside, the ion conductivity is high and the interfacial resistance of the electrode is low as compared with an electricity storage device having a solid electrolyte, so that a higher output can be obtained.

As further shown, the cavity of the storage container 40 is sealed by a lid 70. More specifically, a seal ring 75 is provided between the lid 70 and the storage container 40, and the lid 70 and the seal ring 75 are sealed by welding. The lid 70 is made of, for example, kovar. A plating layer such as Ni plating may be formed on the surface of the lid 70. The seal ring 75 is made of, for example, kovar. On the surface of the seal ring 75, a plating layer, for example, two layers of a Ni-plated base layer and an Au-plated surface layer may be formed. Welding can be performed by, for example, seam welding or laser welding.

(Method of Producing Electricity Storage Device in Second Embodiment)

An example of a method of producing the electricity storage device 200 in the second embodiment will be described.

An unfired mother laminate is produced in a similar manner to that of the electricity storage device 100 in the first embodiment. However, instead of applying a paste containing a material for forming the outer layer, a paste containing a material for forming the second insulating layer 14b is applied.

Subsequently, the mother laminate is pressed and then cut into a predetermined size for individualization to obtain an unfired multi-layer chip. Then, a paste containing materials for forming the first end surface electrode 1 and the second end surface electrode 2 is applied.

Subsequently, a paste containing a material for forming the first conductive part 60a is applied so as to cover the first terminal of the unfired storage container, and a paste containing a material for forming the second conductive part 60b is applied so as to cover the second terminal. Then, after firing, the multi-layer chip is placed in the unfired storage container so that the first conductive part 60a electrically connects between the first end surface electrode 1 and the first terminal 41, and the second conductive part 60b electrically connects between the second end surface electrode 2 and the second terminal 42.

Subsequently, the unfired multi-layer chip and the unfired storage container are fired. The firing temperature is determined by the melting point of the materials used. For example, when Al is used for the current collector, the firing temperature is preferably 700° C. or more and 800° C. or less.

Subsequently, the electrolytic solution 50 is poured through the cavity of the storage container 40, and then the cavity of the storage container 40 is sealed by the lid 70 with the seal ring 75 interposed therebetween.

Thus, according to an exemplary aspect, the electricity storage device 200 can be produced by the above-mentioned steps.

In general, it is noted that the present invention is not limited to the above embodiments, and various applications and modifications can be added within the scope of the present invention.

Moreover, the electricity storage device 100 according to the first embodiment has a configuration in which the outer layer 15 that protects the first main surface 10c, the second main surface 10d, the first side surface 10e, and the second side surface 10f of the internal element 10 is provided, but may have a configuration in which no outer layer 15 is provided.

In the electricity storage device 200 according to the second embodiment mentioned above, the storage container 40 accommodating the internal element 30 is formed of a material including at least one of a ceramic material and a glass material; and the first internal electrode 11, the second internal electrode 12, the separator layer 13, the first end surface electrode 1, the second end surface electrode 2, and the conductive part 60 are integrally sintered to form a sintered body.

On the other hand, like a coin type battery, the storage container for accommodating the internal element 30 may be made of a metal such as stainless steel. In that case, a sintered body is formed by integrally sintering the first internal electrode 11, the second internal electrode 12, the separator layer 13, the first end surface electrode 1, and the second end surface electrode 2 forming the internal element 30. Even in this configuration, the electrolytic solution is stored in the storage container, and the electrolytic solution permeated the internal element 30 is present.

DESCRIPTION OF REFERENCE SYMBOLS

1: First end surface electrode
2: Second end surface electrode
10: Internal element
11: First internal electrode
11a: First current collector
11b: First active material layer
12: Second internal electrode
12a: Second current collector
12b: Second active material layer
13: Separator layer
14: Insulating layer
15: Outer layer
16: Injection port
17: Sealing member
30: Internal element
40: Storage container
41: First terminal
42: Second terminal
43: First external electrode
44: Second external electrode
45: First via conductor
46: Second via conductor
50: Electrolytic solution
60: Conductive part
60a: First conductive part
60b: Second conductive part
70: Lid
75: Seal ring
100, 200: Electricity storage device

The invention claimed is:

1. An electricity storage device comprising:
   an internal element having:
      a first main surface and a second main surface that each extend along a length direction and a width direction and face each other in a thickness direction,
      a first side surface and a second side surface that each extend along the length direction and the thickness direction and that face each other in the width direction,
      a first end surface and a second end surface that each extend along the width direction and the thickness direction and that face each other in the length direction,
      a first internal electrode that extends out to the first end surface,
      a second internal electrode that extends out to the second end surface,
      a separator layer disposed between the first internal electrode and the second internal electrode, and
      an electrolytic solution;
   a first end surface electrode disposed on the first end surface and connected to the first internal electrode; and
   a second end surface electrode disposed on the second end surface and connected to the second internal electrode,
   wherein the first internal electrode, the second internal electrode, the separator layer, the first end surface electrode, and the second end surface electrode are integrally sintered with each other to form a sintered body, and
   wherein the first internal electrode does not extend out to the second end surface and the second internal electrode does not extend out to the first end surface.

2. The electricity storage device according to claim 1, further comprising an outer layer constructed to protect the first main surface, the second main surface, the first side surface, and the second side surface of the internal element.

3. The electricity storage device according to claim 2, wherein the outer layer is a sintered body comprising a material containing at least one of a ceramic material containing at least one selected from the group consisting of oxides, nitrides, and carbides, and a glass material as an amorphous solid.

4. The electricity storage device according to claim 3, wherein the outer layer includes an injection port configured for injecting the electrolytic solution, and further includes a sealing member configured for sealing the injection port.

5. The electricity storage device according to claim 1, further comprising a storage container for accommodating the internal element.

6. The electricity storage device according to claim 5, further comprising a conductive part that includes a composite of metal particles and glass as an amorphous solid, and electrically connects a first external electrode or a second external electrode provided in the storage container to the internal element.

7. The electricity storage device according to claim 6, wherein the storage container includes:
   a first terminal disposed on an inner bottom surface facing the internal element;
   the first external electrode disposed on an outer bottom surface opposite to the inner bottom surface and electrically connected to the first terminal;
   a second terminal disposed on the inner bottom surface; and the second external electrode disposed on the outer bottom surface and electrically connected to the second terminal.

8. The electricity storage device according to claim 7, wherein the conductive part includes a first conductive part that electrically connects between the first end surface electrode and the first terminal, and a second conductive part that electrically connects between the second end surface electrode and the second terminal.

9. The electricity storage device according to claim 8, wherein the first internal electrode, the second internal electrode, the separator layer, the first end surface electrode, the second end surface electrode, the storage container, and the conductive part are integrally sintered with each other to form the sintered body.

10. The electricity storage device according to claim 9, wherein the first conductive part covers a surface of the first terminal, and the second conductive part covers a surface of the second terminal.

11. The electricity storage device according to claim 1, wherein the separator layer is a sintered body formed from a material containing at least one of a ceramic material containing at least one selected from the group consisting of oxides, nitrides, and carbides, and a glass material as an amorphous solid.

12. The electricity storage device according to claim 1, wherein the internal element comprises a rectangular parallelepiped shape.

13. An electricity storage device comprising:
an internal element having:
a first main surface and a second main surface that each extend along a length direction and a width direction and face each other in a thickness direction,
a first side surface and a second side surface that each extend along the length direction and the thickness direction and that face each other in the width direction,
a first end surface and a second end surface that each extend along the width direction and the thickness direction and that face each other in the length direction,
a first internal electrode that extends out to the first end surface,
a second internal electrode that extends out to the second end surface,
a separator layer disposed between the first internal electrode and the second internal electrode, and
an electrolytic solution;
a first end surface electrode disposed on the first end surface and connected to the first internal electrode; and
a second end surface electrode disposed on the second end surface and connected to the second internal electrode,
wherein the first internal electrode, the second internal electrode, the separator layer, the first end surface electrode, and the second end surface electrode are integrally sintered with each other to form a sintered body,
wherein the first internal electrode and the second internal electrode each have a current collector and an active material layer, and
wherein the active material layer contains active material particles and an inorganic filler composed of an inorganic substance.

14. The electricity storage device according to claim 13, wherein the current collector is a sintered body of metal particles.

15. The electricity storage device according to claim 13, wherein the internal element comprises a rectangular parallelepiped shape.

16. An electricity storage device comprising:
an internal element having:
a first main surface and a second main surface that each extend along a length direction and a width direction and face each other in a thickness direction,
a first side surface and a second side surface that each extend along the length direction and the thickness direction and that face each other in the width direction,
a first end surface and a second end surface that each extend along the width direction and the thickness direction and that face each other in the length direction,
a first internal electrode that extends out to the first end surface,
a second internal electrode that extends out to the second end surface,
a separator layer disposed between the first internal electrode and the second internal electrode, and
an electrolytic solution;
a first end surface electrode disposed on the first end surface and connected to the first internal electrode; and
a second end surface electrode disposed on the second end surface and connected to the second internal electrode,
wherein the first internal electrode, the second internal electrode, the separator layer, the first end surface electrode, and the second end surface electrode are integrally sintered with each other to form a sintered body, and
wherein the first end surface electrode and the second end surface electrode are a composite of metal particles and glass as an amorphous solid.

17. The electricity storage device according to claim 16, wherein the internal element comprises a rectangular parallelepiped shape.

18. The electricity storage device according to claim 16, wherein:
the first internal electrode and the second internal electrode each have a current collector and an active material layer, with the active material layer containing active material particles and an inorganic filler composed of an inorganic substance, and
the current collector is a sintered body of metal particles.

19. The electricity storage device according to claim 16, wherein the separator layer is a sintered body formed from a material containing at least one of a ceramic material containing at least one selected from the group consisting of oxides, nitrides, and carbides, and a glass material as an amorphous solid.

20. The electricity storage device according to claim 16, wherein the first end surface electrode and the second end surface electrode are a composite of metal particles and glass as an amorphous solid.

* * * * *